United States Patent
Koshino

(10) Patent No.: US 6,169,909 B1
(45) Date of Patent: Jan. 2, 2001

(54) MOBILE COMMUNICATION SYSTEM WITH RE-CONNECT FUNCTION FOR NON-SPEECH DATA COMMUNICATIONS

(75) Inventor: Katsuhide Koshino, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/112,137

(22) Filed: Jul. 9, 1998

(30) Foreign Application Priority Data

Jul. 14, 1997 (JP) .................................................. 9-188025

(51) Int. Cl.$^7$ ....................................................... H04M 1/00
(52) U.S. Cl. ............................ 455/557; 455/63; 455/423
(58) Field of Search ................................... 455/557, 556, 455/422, 67.1, 69, 63, 423; 375/222, 219, 220

(56) References Cited

U.S. PATENT DOCUMENTS

| | | | |
|---|---|---|---|
| 4,697,281 | * | 9/1987 | O'Sullivan ............................ 455/557 |
| 4,912,756 | * | 3/1990 | Hop ...................................... 455/423 |
| 5,257,397 | * | 10/1993 | Barzegar et al. ...................... 455/422 |
| 5,444,862 | * | 8/1995 | Hibino .................................. 455/504 |
| 5,612,991 | * | 3/1997 | Nair et al. ............................. 455/423 |
| 5,612,992 | | 3/1997 | Dupuy et al. .......................... 455/466 |
| 5,802,039 | * | 9/1998 | Obayashi et al. ..................... 370/216 |

FOREIGN PATENT DOCUMENTS

| | | | |
|---|---|---|---|
| 2292503 | * | 8/1995 | (GB) ............................. H04L/12/28 |
| 2 292 503 | | 2/1996 | (GB) . |
| 63-111732 | | 5/1988 | (JP) . |
| 1-264321 | | 10/1989 | (JP) . |
| 1-282950 | | 11/1989 | (JP) . |
| 1-293052 | | 11/1989 | (JP) . |
| 2-233043 | | 9/1990 | (JP) . |
| 6-169482 | | 6/1994 | (JP) . |
| 6-315006 | | 11/1994 | (JP) . |
| 7-177576 | | 7/1995 | (JP) . |
| 8-19049 | | 1/1996 | (JP) . |
| 8-140139 | | 5/1996 | (JP) . |

* cited by examiner

Primary Examiner—Fan Tsang
Assistant Examiner—Blane J. Jackson
(74) Attorney, Agent, or Firm—McGuireWoods, LLP

(57) ABSTRACT

A mobile communication system for performing non-speech data communication through a radio zone between a mobile station and a base station includes a terminal, a mobile station, and an adaptor. The terminal transmits/receives non-speech data. The mobile station is accommodated in a base station through a radio zone. The adaptor is arranged between the terminal and the mobile station. The adaptor converts non-speech data to be transmitted/received to/from the terminal and a predetermined frame to be used in the radio zone through the mobile station, and performs error control in units of frames. The mobile station outputs a holding instruction to the adaptor in accordance with radio wave interruption in the radio zone, and outputs a holding cancel instruction to the adaptor in accordance with radio wave restoration. The adaptor instructs the terminal to pause non-speech data transmission/reception in accordance with the holding instruction from the mobile station, and pauses frame transmission/reception to/from the mobile station. The adaptor instructs the terminal to resume non-speech data transmission/reception in accordance with the holding cancel instruction from the mobile station, and resumes frame transmission/reception to/from the mobile station.

14 Claims, 8 Drawing Sheets

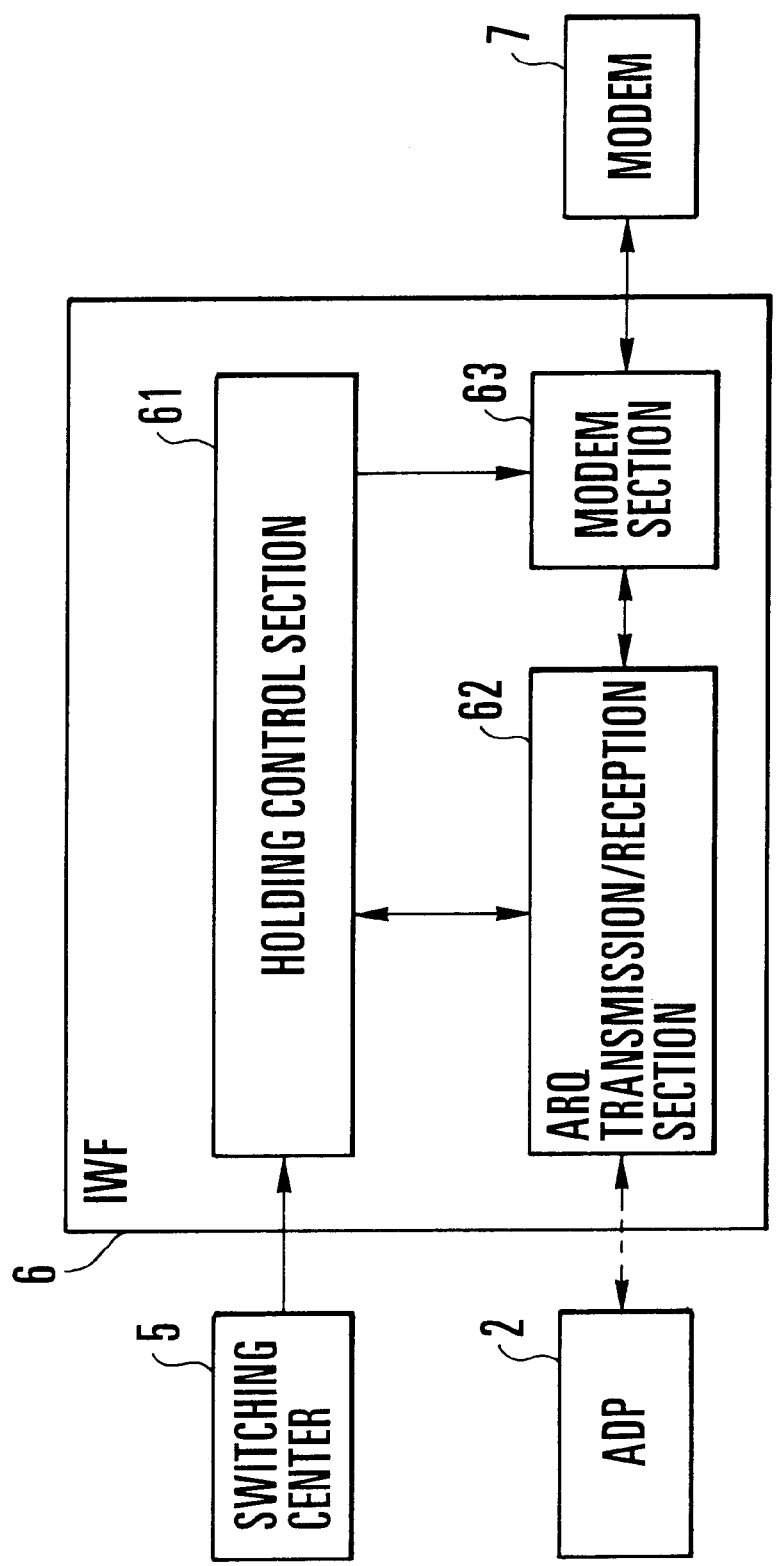
F I G. 6

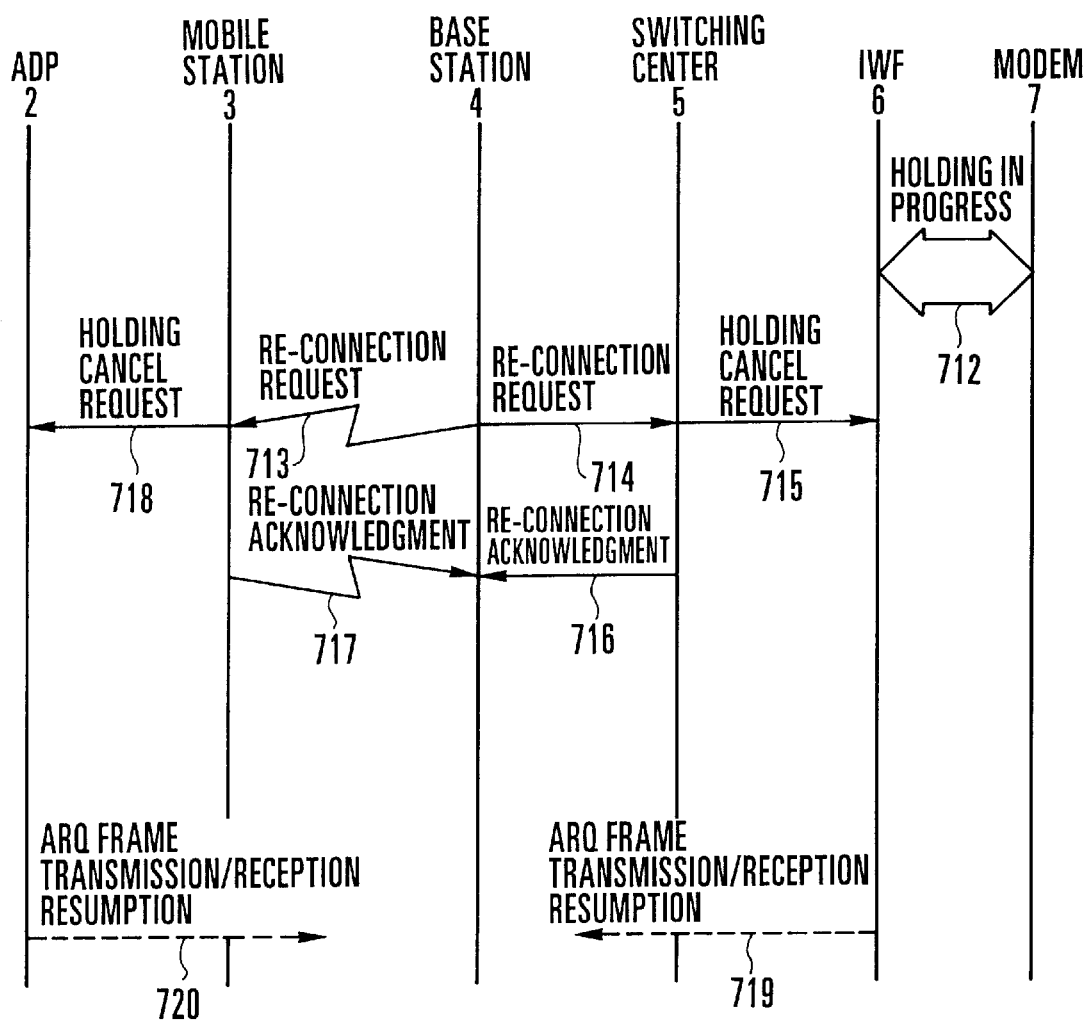
F I G. 10

MOBILE COMMUNICATION SYSTEM WITH
RE-CONNECT FUNCTION FOR NON-
SPEECH DATA COMMUNICATIONS

BACKGROUND OF THE INVENTION

The present invention relates to a mobile communication system and, more particularly, to a mobile communication system in which re-connection is performed when radio wave interruption occurs during non-speech data communication.

A mobile communication system has been proposed (for example, Japanese Patent Laid-Open No. 6-315006), in which when a mobile station moves into a dead zone, and radio wave interruption occurs between the mobile station and the base station, the switching center holds the call on the network side, and the mobile station or the base station keeps transmitting a predetermined message during the radio wave interruption. Upon detection of this message, the base station or the mobile station cancels the call holding in the switching center, and re-connects the call.

In addition, the following system has been proposed (for example, Japanese Patent Laid-Open No. 7-177576). When the strength of the electric field generated by the mobile station temporarily decreases, the network holds communication with a remote terminal, and notifies the remote terminal that the communication is held because of the decrease in electric field strength, as needed.

Upon detection of a communication resume instruction from the mobile station after restoration of the electric field strength, the network cancels the holding and resumes the communication. If no communication resume instruction from the mobile station is detected within a predetermined period of time after the holding, the network notifies the remote terminal that the communication is interrupted because no communication resume instruction is obtained, thereby interrupting the channel.

In such conventional mobile communication systems, re-connection is to be performed when radio wave interruption occurs during speech communication, but no consideration is given to radio wave interruption during communication of non-speech data, i.e., digital information. These re-connection methods cannot therefore be applied to re-connection processing for non-speech data communication without any modification.

This is because, when non-speech data communication is to be performed, an adaptor (ADP) placed on the mobile station side and an interworking function (IWF) placed on the switching center side are required as devices for non-speech data communication in addition to the constituent elements used for speech communication.

When speech communication is to be resumed, it suffices if the users resume speech communication. Assume that non-speech data communication is to be resumed upon occurrence of call disconnection during communication. In this case, when the system has logged in to a remote system to execute a program remotely, in particular, the system must log in to the remote system again to re-execute the program. This requires many re-connection steps as compared with the case of speech communication.

SUMMARY OF THE INVENTION

The present invention has been made to solve a this problem, and has as its object to provide a mobile communication system which can prevent communication interruption even if a radio wave condition deteriorates during non-speech data communication, and can resume the communication in accordance with restoration of the radio wave condition.

A mobile communication system for performing non-speech data communication through a radio zone between a mobile station and a base station, comprising a terminal for transmitting/receiving non-speech data, a mobile station accommodated in a base station through a radio zone, and an adaptor arranged between the terminal and the mobile station to convert non-speech data to be transmitted/received to/from the terminal and a predetermined frame to be used in the radio zone through the mobile station, and perform error control in units of frames, wherein the mobile station outputs a holding instruction to the adaptor in accordance with radio wave interruption in the radio zone, and outputs a holding cancel instruction to the adaptor in accordance with radio wave restoration, and the adaptor instructs the terminal to pause non-speech data transmission/reception in accordance with the holding instruction from the mobile station, pauses frame transmission/reception to/from the mobile station, instructs the terminal to resume non-speech data transmission/reception in accordance with the holding cancel instruction from the mobile station, and resumes frame transmission/reception to/from the mobile station.

BRIEF DESCRIPTION OF THE DRAWINGS

FIG. 6 is a block diagram showing the internal arrangement of an IWF;

FIG. 10 is a view showing a sequence of operation of the embodiment in FIG. 8.

DESCRIPTION OF THE PREFERRED EMBODIMENTS

The present invention will be described below with reference to the accompanying drawings.

Figure 1:
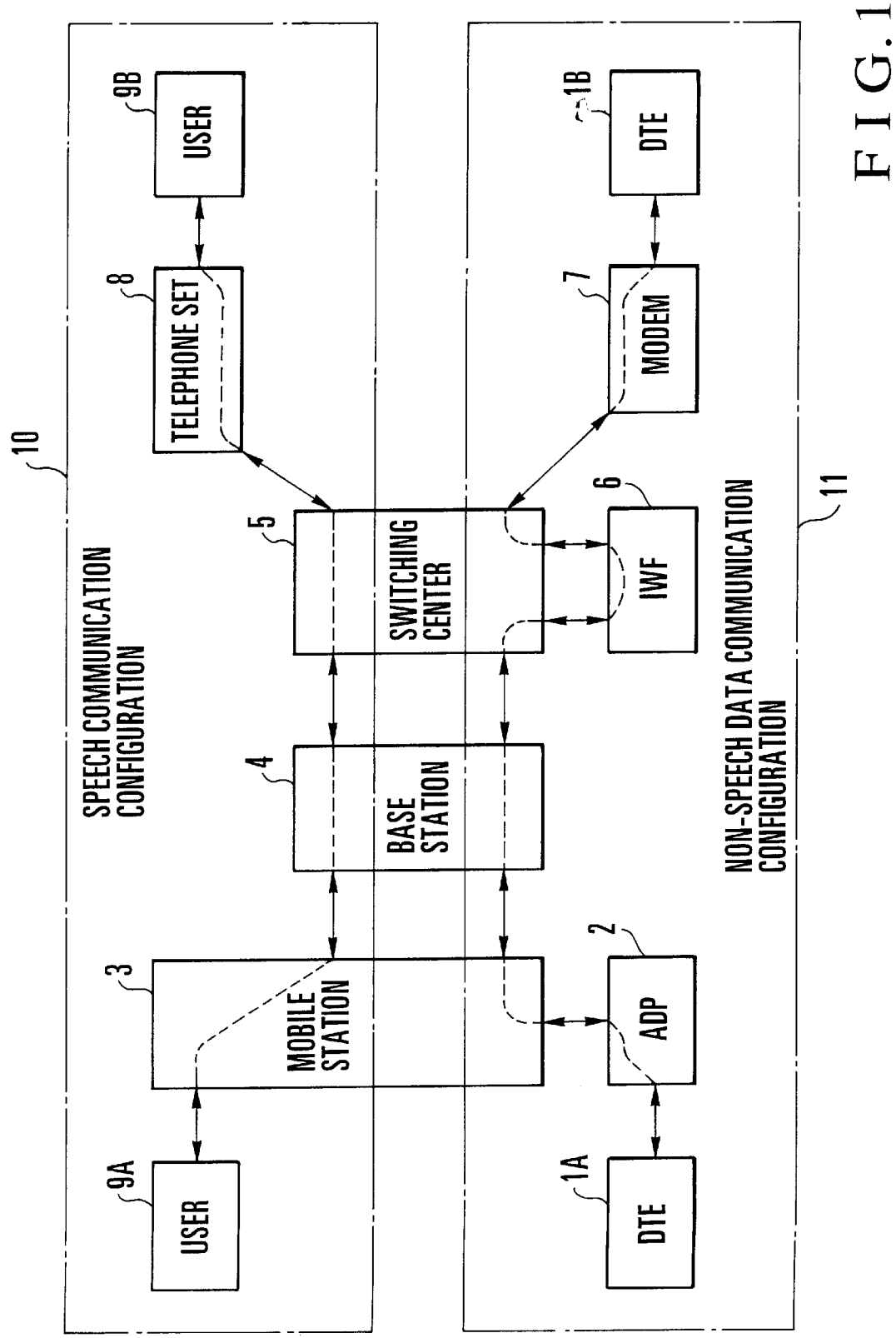
FIG. 1 is a block diagram showing the overall arrangement of a mobile communication system according to an embodiment of the present invention.

FIG. 1 shows the overall arrangement of a mobile communication system according to an embodiment of the present invention.

Referring to FIG. 1, the apparatus configuration of the mobile communication system can be roughly divided into a speech communication configuration 10 and a non-speech data communication configuration 11.

In the speech communication configuration 10, users 9a and 9b respectively use a mobile station 3 and a telephone set 8 to have a telephone conversion.

The mobile station 3 has the function of performing radio zone communication with a base station 4 and a holding control function like the one in the prior art.

The base station 4 has the function of performing radio zone communication with the mobile station 3 and the function of detecting a radio wave interruption state in a radio zone and notifying a switching center 5 of the detected state.

The switching center 5 has the function of setting a communication path between the base station 4 and the telephone set 8 and the communication path holding function like the one in the prior art.

In the non-speech data communication configuration 11, data terminal equipment (to be referred to as DTE hereinafter) 1A is connected to the mobile station 3 through an adaptor (to be referred to as an ADP hereinafter) 2. In addition, a DTE 1B is connected to the switching center 5 through a modem 7 to perform non-speech data communication.

The ADP 2 has the function of communicating with an interworking function (to be referred to as an IWF hereinafter) 6 by using an ARQ (Automatic Request for Repetition) communication protocol in a radio zone.

Note that the ARQ communication protocol is an error control procedure for determining the presence/absence of an error in received data in units of frames each consisting of a predetermined number of data on the reception side, and automatically requesting the transmission side to retransmit a corresponding frame if the presence of an error is determined. This protocol is used for a PHS (Personal Handyphone System).

The IWF is the function of implementing conversion to a signal scheme and a protocol which are required for connection between networks with difference schemes, negotiations concerning incoincidence between transfer function types and additional service types, and the like. In this case, the IWF is connected to the switching center 5 to implement connection between a mobile communication network on the base station 4 side and a telephone communication network on the modem 7 side.

The ADP 2 has the function of pausing/resuming transmission/reception of non-speech data by performing data flow control on the DTE 1A so as to enable a holding function during data communication.

The IWF 6 has the function of communicating with the modem 7 by using a modem communication protocol and the function of pausing/resuming transmission/reception of non-speech data by performing data flow control on the IWF 6 or the DTE 1B so as to enable a holding function during data communication.

Figure 2:
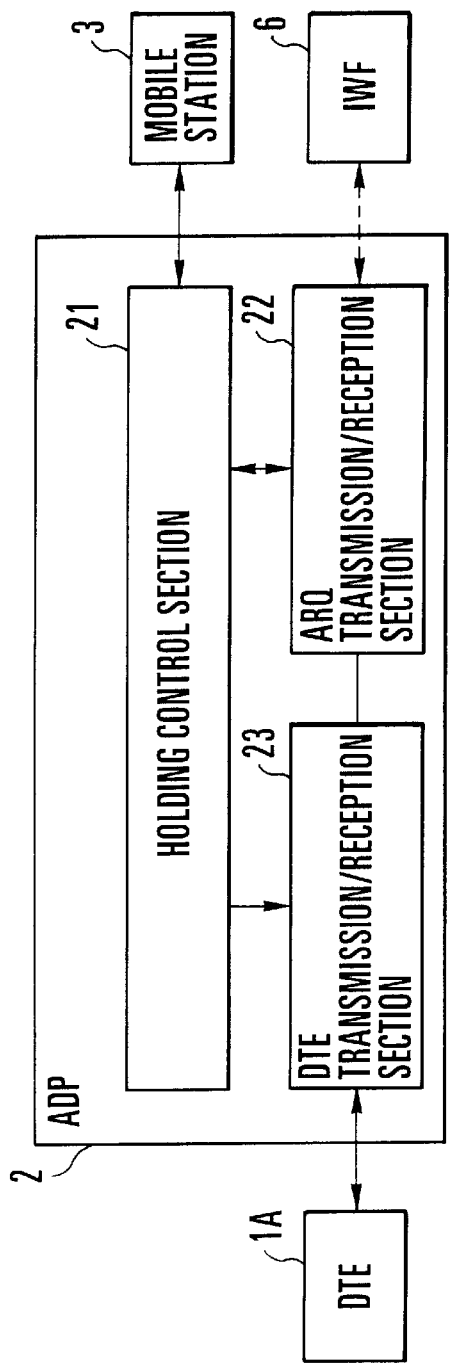
FIG. 2 is a block diagram showing the internal arrangement of an ADP.

FIG. 2 shows the internal arrangement of the ADP.

Referring to FIG. 2, a holding control section 21 has the function of receiving a holding request or holding cancel request from the mobile station 3 and instructing a DTE transmission/reception section 23 to perform flow control, and the function of logically instructing an ARQ transmission/reception section 22 to stop or resume transmission/reception of an ARQ frame to/from the IWF 6.

The ARQ transmission/reception section 22 has the function of stopping/resuming transmission/reception of an ARQ frame to/from the IWF 6, the function of detecting re-establishment of ARQ frame synchronization on the basis of an ARQ frame received from the IWF 6, and the function of transmitting/receiving data to/from the DTE transmission/reception section 23.

The DTE transmission/reception section 23 has the function of transmitting/receiving data to/from the DTE 1A and a flow control function for the DTE 1A.

Figure 3:
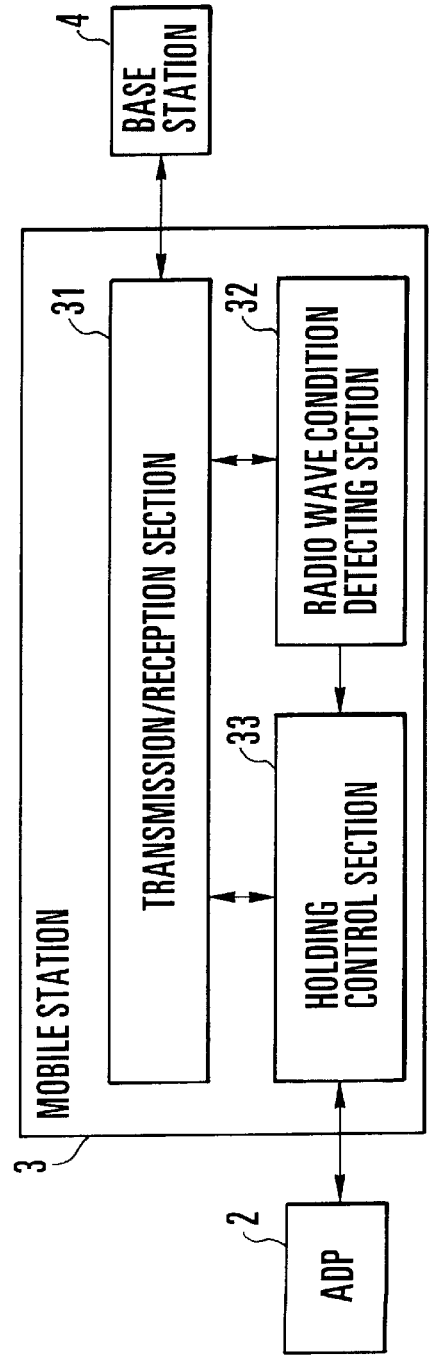
FIG. 3 is a block diagram showing the internal arrangement of a mobile station.

FIG. 3 shows the internal arrangement of the mobile station 3.

Referring to FIG. 3, a transmission/reception section 31 has the function of transmitting/receiving a signal to/from the base station 4 in a radio zone, and the function of transmitting a re-connection request signal to the base station 4 in particular.

A radio wave condition detecting section 32 has the function of always monitoring the received radio wave condition in the transmission/reception section 31 and notifying a holding control section 33 that the radio wave condition has deteriorated or restored, and the function of causing the transmission/reception section 31 to transmit a re-connection request signal when the radio wave condition is restored.

The holding control section 33 has the function of outputting a holding request or holding cancel request to the ADP 2 in accordance with the notification from the radio wave condition detecting section 32.

Figure 4:
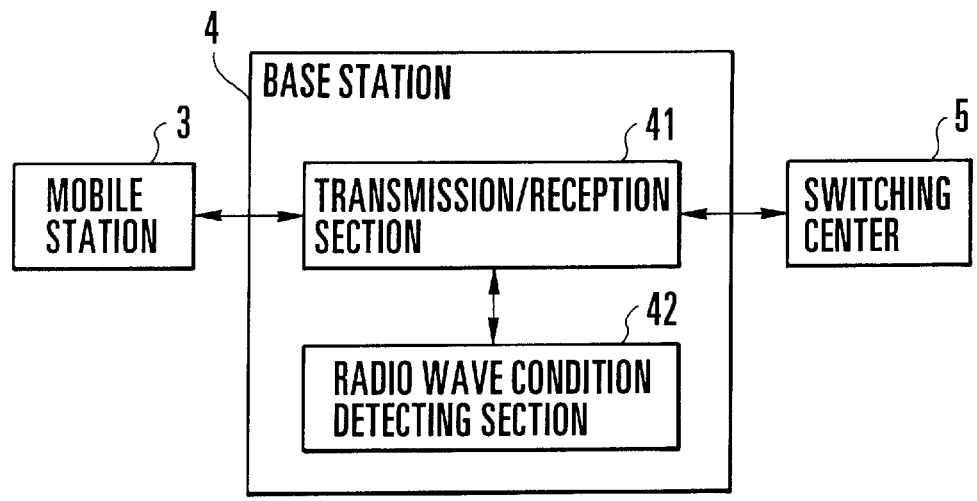
FIG. 4 is a block diagram showing the internal arrangement of a base station.

FIG. 4 shows the internal arrangement of the base station 4.

Referring to FIG. 4, a transmission/reception section 41 has the function of transmitting/receiving a signal to/from the mobile station 3 in a radio zone and the function of transmitting/receiving a signal to/from the switching center 5.

A radio wave condition detecting section 42 has the function of always monitoring the received radio wave condition in the transmission/reception section 41 and notifying the switching center 5 of radio wave interruption through the transmission/reception section 41 when the radio wave condition deteriorates.

Figure 5:
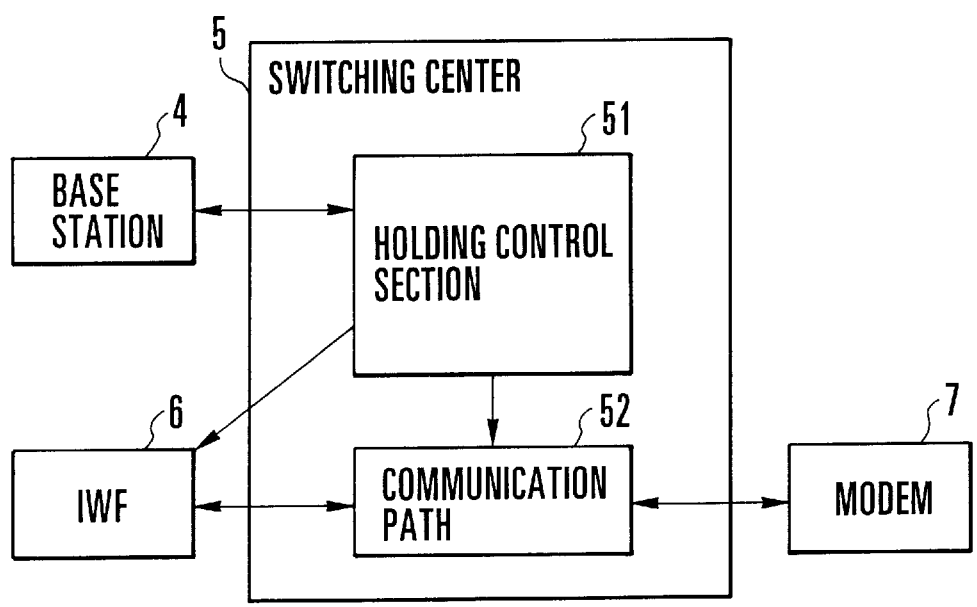
FIG. 5 is a block diagram showing the internal arrangement of a switching center.

FIG. 5 shows the internal arrangement of the switching center 5.

Referring to FIG. 5, a holding control section 51 has the function of outputting a holding request to the IWF 6 upon reception of a radio wave interruption notification from the base station 4 and the function of holding a communication path 52.

The holding control section 51 also has the function of notifying the base station 4 of a re-connection acknowledgement and the IWF 6 of a holding cancel request upon reception of a re-connection request notification from the base station 4.

The communication path 52 is a communication path between the IWF 6 and the modem 7 and has the function of physically enabling communication.

FIG. 6 shows the internal arrangement of the IWF 6.

Referring to FIG. 6, a holding control section 61 has the function of instructing a modem section 63 to perform flow control in accordance with the holding request or holding cancel request from the switching center 5, and the function of logically instructing an ARQ transmission/reception section 62 to stop or resume transmission/reception of an ARQ frame to/from the ADP 2.

The ARQ transmission/reception section 62 has the function of transmitting/receiving an ARQ protocol to/from the ADP 2 and transmitting/receiving data to/from the modem section 63.

The modem section 63 has the function of transmitting/receiving data to/from the modem 7 by using wave transmitted from the base station 4 reaches the mobile station 3.

In the base station 4, since the reception condition in a radio zone in the transmission/reception section 41 deteriorates as step 702 is performed, the radio wave condition detecting section 42 detects this condition.

If the condition deteriorates considerably and radio wave interruption occurs, the radio wave condition detecting section 42 notifies the switching center 5 of the radio wave interruption through the transmission/reception section 41 in step 703.

The holding control section 51 of the switching center 5, which receives the radio wave interruption notification in step 703, maintains/holds the communication path 52 to prevent the communication between the IWF 6 and the modem 7 from being physically interrupted.

In addition, to prevent physical interruption of the communication, the holding control section 51 outputs a holding request to the IWF 6 in step 704.

Upon reception of the holding request in step 704, the holding control section 61 of the IWF 6 instructs the ARQ transmission/reception section 62 to stop transmission/reception of an ARQ frame, and outputs a flow stop instruction to the modem section 63. a modem protocol and the function of performing flow control on the modem 7.

The modem section 63 has the function of transmitting/receiving data to/from the ARQ transmission/reception section 62. For this reason, when data is transmitted/received between the ARQ transmission/reception section 62 and the modem section 63, the data is converted in accordance with the respective protocols used by them.

The operation of the present invention will be described next with reference to FIG. 7.

Figure 7:
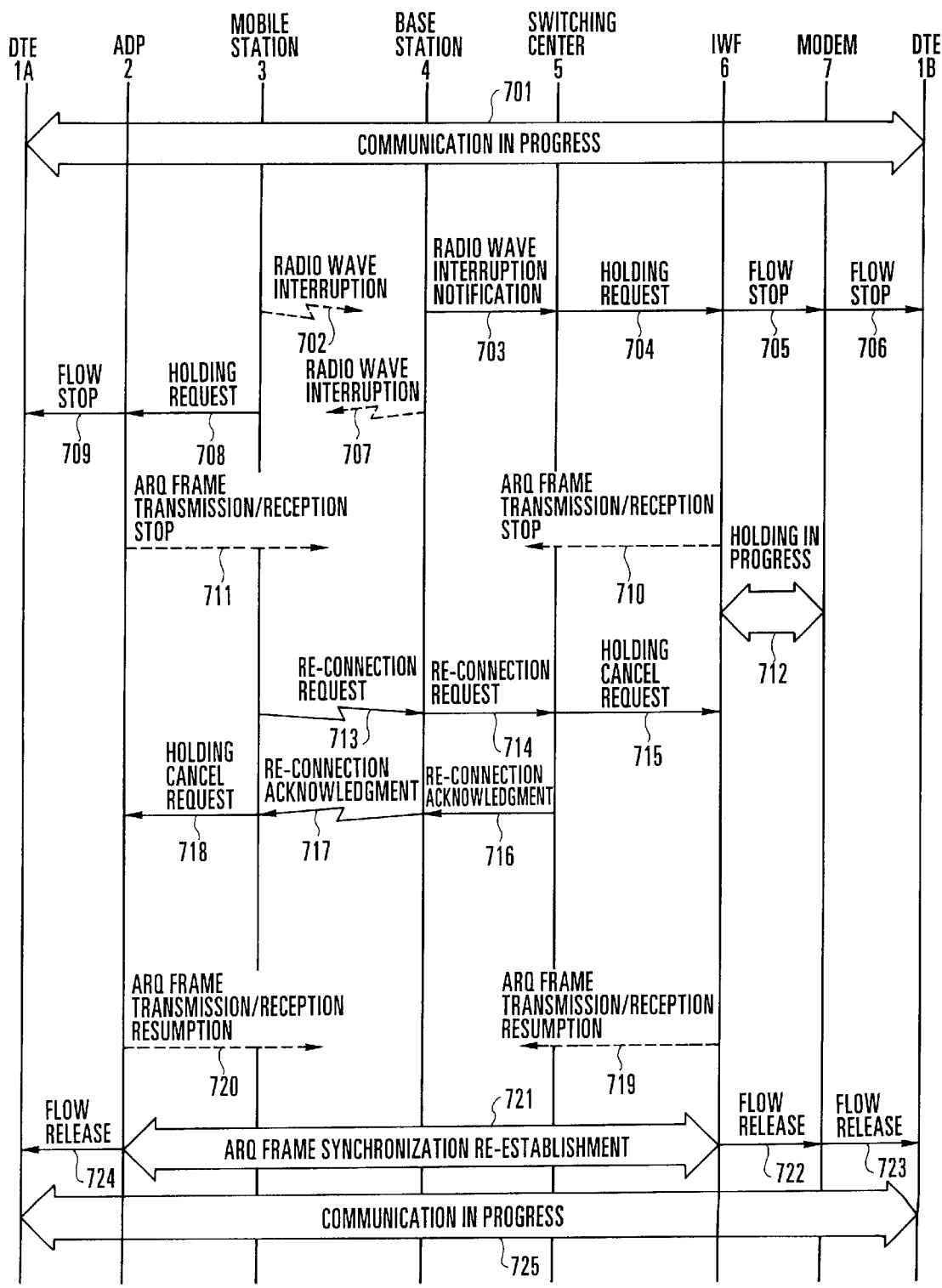
FIG. 7 is a view showing a sequence of operation of the present invention.

FIG. 7 shows a sequence of operation of the present invention.

In step 701, in the non-speech data communication configuration 11, the DTE 1A and the DTE 1B are communicating with each other and transmitting/receiving data through the following transmission route: DTE 1A—DTE transmission/reception section 23—ARQ transmission/reception section 22—ARQ transmission/reception section 62—modem section 63 modem 7—DTE 1B by using the communication path set in advance between the switching center 5 and the base station 4.

When the radio wave condition in a radio zone deteriorates, step 702 is performed, in which no radio wave transmitted from the mobile station 3 reaches the base station 4, together with step 707 in which no radio The modem section 63 performs flow stop control on the modem 7 as a connection partner in step 705 so as to make a flow stop with respect to the DTE 1B in step 706.

Since the ARQ transmission/reception section 62 stops transmission/reception of an ARQ frame to/from the ADP 2 in step 710, data transmission/reception between the IWF 6 and the modem 7 is stopped. As a result, the communication is held in step 712.

On the mobile station 3 side, since the reception condition in a radio zone deteriorates in the transmission/reception section 31, the radio wave condition detecting section 32 detects this condition in step 707.

When the condition deteriorates considerably, and radio wave interruption occurs, the radio wave condition detecting section 32 notifies the holding control section 33 of the radio wave interruption in step 708.

Upon reception of the radio wave notification, the holding control section 33 outputs a holding request to the ADP 2 in step 708.

The holding control section 21 of the ADP 2, which receives the holding request in step S708, outputs a flow stop instruction to the DTE transmission/reception section 23 to prevent the communication between the ADP 2 and the DTE 1A from being physically interrupted. At the same time, the holding control section 21 outputs an ARQ frame transmission/reception stop instruction to the ARQ transmission/reception section 22.

The DTE transmission/reception section 23 outputs a flow stop instruction to the DET 1A in step 709.

In step 711, the ARQ transmission/reception section 22 stops transmission/reception of an ARQ frame to/from the IWF 6. When, therefore, the radio wave condition in a radio zone is restored afterward, the radio wave condition detecting section 32 of the mobile station 3 detects this condition, and transmits a re-connection request to the switching center 5 through the transmission/reception section 31 in step 713.

The re-connection request transmitted in step 713 is sent to the switching center 5 through the base station in step S714.

The holding control section 51 of the switching center 5 outputs a holding cancel request to the IWF 6 to resume the communication between the IWF 6 and the modem 7 in step 715. At the same time, the holding control section 51 notifies the mobile station 3 of a re-connection acknowledgement in step 716.

The re-connection acknowledgement in step 716 is sent from the base station 4 to the mobile station 3 in step 717.

Upon reception of the holding request in step 715, the holding control section 61 of the IWF 6 outputs a frame transmission/reception resume instruction to the ARQ transmission/reception section 62.

The ARQ transmission/reception section 62 resumes transmission/reception of an ARQ frame to/from the mobile station 3 in the ADP 2 in step 719.

On the mobile station 3 side, the transmission/reception section 31 receives the re-connection acknowledgement in step 717, and notifies the holding control section 33 of the acknowledgement.

The holding control section 33 outputs a holding cancel request to the ADP 2 in step 718.

Upon reception of the holding cancel request in step 718, the holding control section 21 of the ADP 2 instructs the ARQ transmission/reception section 22 to resume transmission/reception of an ARQ frame. In step 720, therefore, the ARQ transmission/reception section 22 resumes transmission/reception of the ARQ frame to/from the IWF 6.

When both the ADP 2 and the IWF 6 resume ARQ frame transmission/reception, ARQ frame synchronization is re-established in step 721.

Upon detection of re-establishment of ARQ synchronization, the ARQ transmission/reception sections 22 and 62 notify the holding control sections 21 and 61 of ARQ synchronization re-establishment.

After ARQ synchronization re-establishment, the holding control section 21 performs flow release control on the DET 1A in step 724, and resumes data transmission/reception between the ADP 2 and the DTE 1A.

After ARQ synchronization re-establishment, the holding control section 61 of the IWF 6 outputs a flow release instruction to the modem section 63.

The modem section 63 performs flow release control on the modem 7 as a connection partner in step 722 so as to perform flow release with respect to the DTE 1B in step 728, thereby resuming data transmission/reception between the IWF 6 and the modem 7.

When flow release is performed both on the ADP 2 side and the IWF 6 side, the communication state in step 725 is restored.

Another embodiment of the present invention will be described next with reference to FIG. 8.

Figure 8:
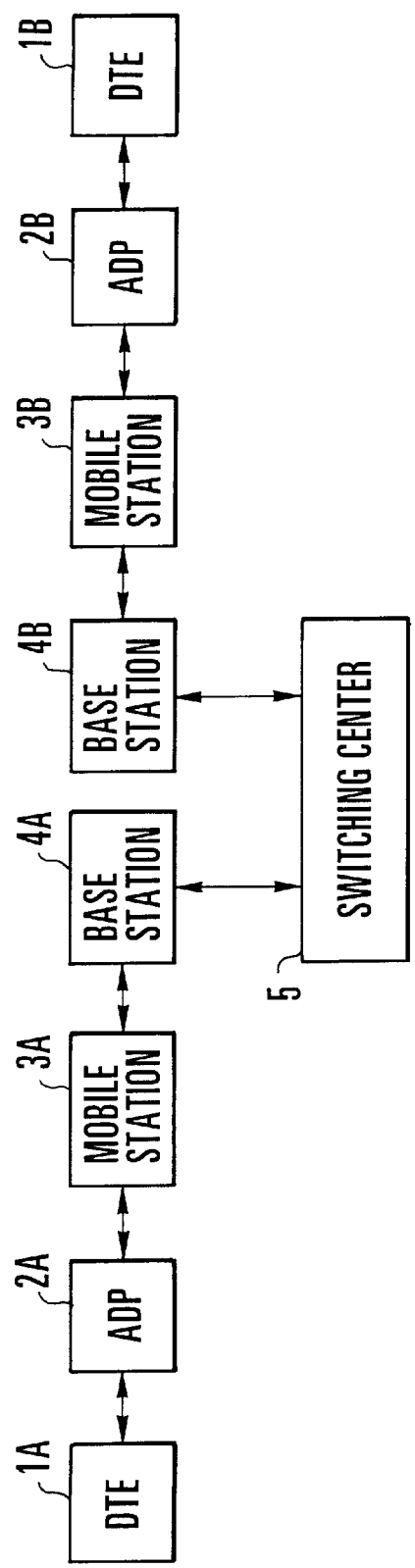
FIG. 8 is a block diagram showing the overall arrangement of a mobile communication system according to another embodiment of the present invention.
Figure 9:
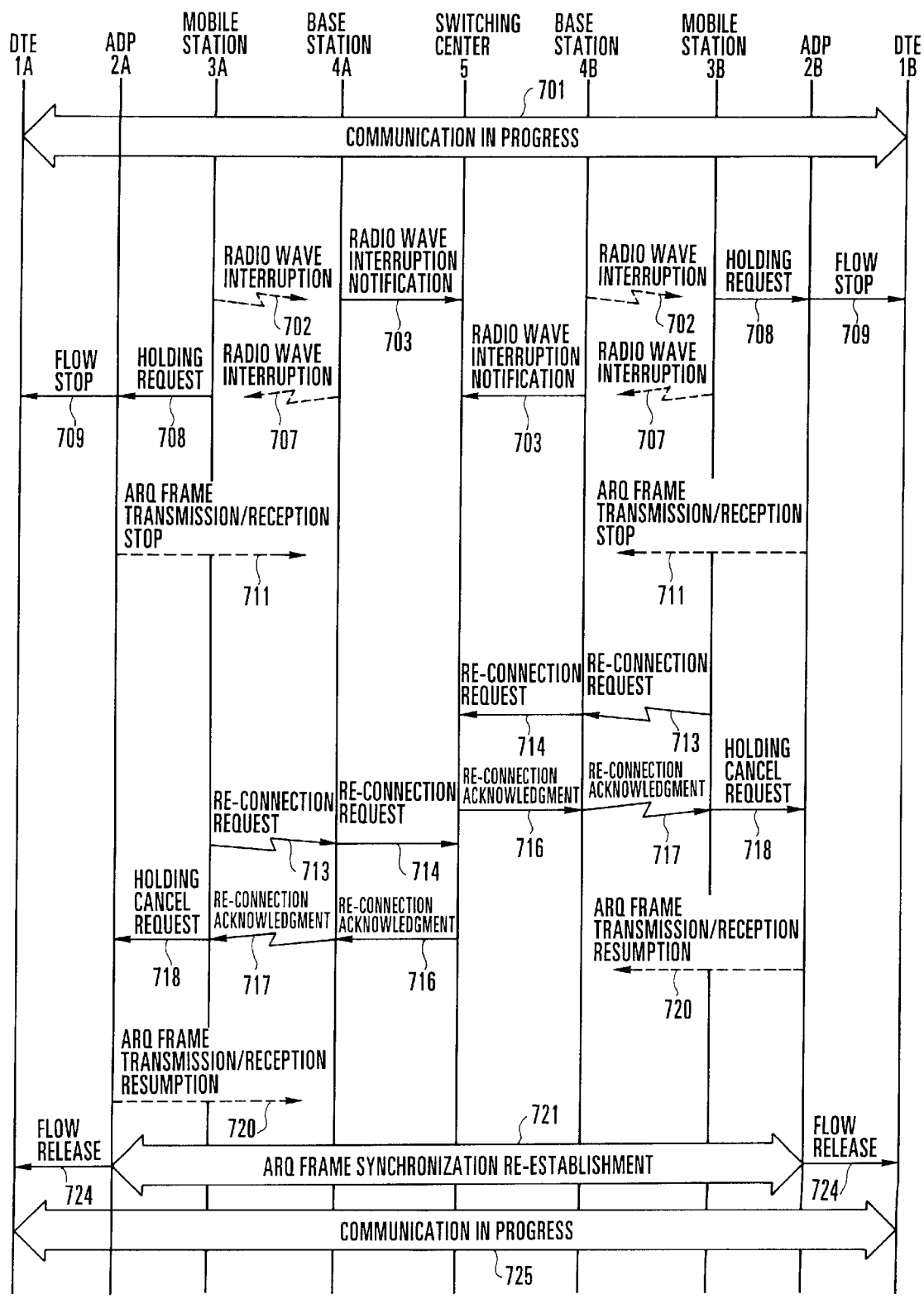
FIG. 9 is a view showing a sequence of operation of the embodiment in FIG. 8.

FIG. 8 shows the overall arrangement of a mobile communication system according to another embodiment of the present invention. FIGS. 9 and 10 show sequences of operation of another embodiment of the present invention.

FIG. 8 shows an arrangement in which two mobiles stations are connected to each other to communicate non-speech data.

Since ADPs 2A and 2B respectively have ARQ transmission/reception sections 22, in particular, communication and holding control can be performed without using the IWF 6 described above and adding another apparatus.

FIG. 9 shows a re-connection sequence to be executed when radio wave interruption occurs in both the mobile stations 2A and 2B.

In this case as well, re-connection can be performed in accordance with the same sequence as that shown in FIG. 7.

FIG. 10 also shows a re-connection sequence in a case in which a base station 4 outputs a re-connection request, which is output first from the mobile station 3 in FIG. 7.

In this case, the base station 4 detects restoration of a radio wave condition, and sends re-connection requests to an ADP 2 and a switching center 5 in steps 714 and 714, respectively.

Steps before and after this step are performed in accordance with the same sequence as that shown in FIG. 7, and re-connection can be performed mainly by the base station 4 in this manner.

As has been described above, according to the present invention, when radio wave interruption occurs between a mobile station and a base station, the conversion unit and the adaptor are notified of this condition. With this operation, data communication is held, and the conversion unit and the adaptor cancel the held state of data communication to re-connect the call when the radio wave condition is restored. Therefore, after the mobile station passes through a dead zone, re-connection of data communication can be quickly and easily performed.

What is claimed is:

1. A mobile communication system for performing non-speech data communication through a radio zone between a mobile station and a base station, comprising:

a terminal for transmitting/receiving non-speech data;

a mobile station accommodated with a base station through a radio zone; and an adaptor arranged between said terminal and said mobile station to convert non-speech data to be transmitted/received to/from said terminal and a predetermined frame to be used in the radio zone through said mobile station, and perform error control in units of frames, wherein said mobile station outputs a holding instruction to said adaptor in accordance with radio wave interruption in the radio zone, and outputs a holding cancel instruction to said adaptor in accordance with radio wave restoration, and said adaptor instructs said terminal to pause non-speech data transmission/reception in accordance with the holding instruction from said mobile station, pauses frame transmission/reception to/from said mobile station, instructs said terminal to resume non-speech data transmission/reception solely in accordance with the holding cancel instruction from said mobile station, and resumes frame transmission/reception to/from said mobile station, wherein said non-speech data transmission/reception is paused in accordance with the holding instruction for an indefinite period of time until the holding cancel instruction is output from said mobile station to said adaptor, whereupon non-speech data transmission/reception resumes.

2. A system according to claim 1, wherein error control is performed on the basis of an ARQ protocol.

3. A mobile communication system for performing non-speech data communication through a radio zone between a mobile station and a base station, comprising:

a terminal for transmitting/receiving non-speech data;

a mobile station accommodated with a base station through a radio zone; and an adaptor arranged between said terminal and said mobile station to convert non-speech data to be transmitted/received to/from said terminal and a predetermined frame to be used in the radio zone through said mobile station, and perform error control in units of frames, wherein said mobile station outputs a holding instruction to said adaptor in accordance with radio wave interruption in the radio zone, and outputs a holding cancel instruction to said adaptor in accordance with radio wave restoration, and said adaptor instructs said terminal to pause non-speech data transmission/reception in accordance with the holding instruction from said mobile station, pauses frame transmission/reception to/from said mobile station, instructs said terminal to resume non-speech data transmission/reception in accordance with the holding cancel instruction from said mobile station, and resumes frame transmission/reception to/from said mobile station, wherein said mobile station outputs the holding cancel instruction to said adaptor in accordance with a re-connection request notified from said base station through the radio zone upon occurrence of radio wave interruption in the radio zone.

4. A mobile communication system for performing non-speech data communication through a radio zone between a mobile station and a base station, comprising:

a terminal for transmitting/receiving non-speech data;

a base station accommodating a mobile station through a radio zone;

a switching center accommodating said base station and said terminal; and an interworking function connected to said switching center to convert non-speech data to be transmitted/received to/from said terminal and a predetermined frame to be used in the radio zone on the base station side, and perform error control in units of frames, wherein said base station outputs a holding instruction to said switching center in accordance with radio wave interruption in the radio zone, and outputs a holding cancel instruction to said switching center in accordance with radio wave restoration, said switching center outputs a holding instruction to said interworking function in accordance with the holding instruction from said base station, and outputs a holding cancel instruction to said switching center in accordance with the holding cancel instruction from said base station, and said interworking function instructs said terminal to pause non-speech data transmission/reception in accordance with the holding instruction from said switching center, pauses frame transmission/reception to/from said base station, instructs said terminal to resume non-speech data transmission/reception in accordance with the holding cancel instruction from said switching center, and resumes frame transmission/reception to/from said base station.

5. A system according to claim 4, wherein said base station outputs a holding cancel instruction to said switching center in accordance with a re-connection request notified from said mobile station through the radio zone upon occurrence of radio wave interruption in the radio zone.

6. A system according to claim 4, wherein said system further comprises a modem between said switching center and said terminal, instructs said terminal to pause non-speech data transmission/transmission in accordance with a holding instruction from said interworking function, and instructs said terminal to resume non-speech data transmission/reception in accordance with a holding cancel instruction from said interworking function.

7. A system according to claim 4, wherein said interworking function transmits/receives frames according to an ARQ communication protocol in the radio zone.

8. A system according to claim 2, wherein said adaptor transmits/receives frames, including said predetermined frame, according to an ARQ communication protocol in the radio zone.

9. A system according to claim 8, further comprising:

an interworking function unit which communicates ARQ frames with said adaptor along a non-speech channel, said interworking function unit resolving protocol incompatibility between said mobile station and said terminal.

10. A system according to claim 9, wherein said adaptor includes:

means for detecting re-establishment of ARQ frame synchronization on a basis of an ARQ frame received from said interworking function unit when non-speech data transmission/reception is resumed.

11. A system according to claim 2, wherein said data is transmitted/received between said mobile station and terminal along a non-speech channel which passes through said adaptor.

12. A system according to claim 2, wherein said data is transmitted/received between said mobile station and terminal along a non-speech channel.

13. A method for performing non-speech data communication through a radio zone, said method comprising:

communicating non-speech data between a mobile station and a base station, said mobile station connected to a first terminal through said adaptor and said base station in communication with a second terminal through a switching network;

outputting a holding instruction from said mobile terminal to said adaptor upon occurrence of a radio wave interruption;

issuing instructions from said adaptor to cause said terminal to pause non-speech data communications in accordance with the holding instruction, and to pause frame communication with said mobile station;

outputting a holding cancel instruction from said mobile station to said adaptor solely in accordance with detection of radio wave restoration;

issuing instructions from said adaptor to cause said terminal to resume non-speech data communications in accordance with said holding cancel instruction; and resuming data communications between said mobile station and said base station wherein said step of outputting said holding cancel instruction from said mobile station is performed in accordance with a re-connection request notified from said base station upon occurrence of said radio wave interruption.

14. A method for performing non-speech data communication through a radio zone, said method comprising:

communicating non-speech data between a mobile station and a base station, said mobile station connected to a first terminal through said adaptor and said base station in communication with a second terminal through a switching network;

outputting a holding instruction from said mobile terminal to said adaptor upon occurrence of a radio wave interruption;

issuing instructions from said adaptor to cause said terminal to pause non-speech data communications in accordance with the holding instruction, and to pause frame communication with said mobile station;

outputting a holding cancel instruction from said mobile station to said adaptor in accordance with detection of radio wave restoration;

issuing instructions from said adaptor to cause said terminal to resume non-speech data communications in accordance with said holding cancel instruction; and resuming data communications between said mobile station and said base station wherein said step of outputting said holding cancel instruction from said mobile station is performed in accordance with a re-connection request notified from said base station upon occurrence of said radio wave interruption.

* * * * *